US008847150B2

(12) United States Patent
Handshaw et al.

(10) Patent No.: US 8,847,150 B2
(45) Date of Patent: Sep. 30, 2014

(54) OBJECT DETECTING SYSTEM FOR IMAGING-BASED BARCODE READERS

(71) Applicant: Symbol Technologies, Inc., Schaumburg, IL (US)

(72) Inventors: Darran M. Handshaw, Sound Beach, NY (US); Mark E. Drzymala, St. James, NY (US); Joseph D. Giordano, Bayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 194 days.

(21) Appl. No.: 13/646,830

(22) Filed: Oct. 8, 2012

(65) Prior Publication Data
US 2014/0097337 A1 Apr. 10, 2014

(51) Int. Cl.
*G06K 7/10* (2006.01)
*G06K 7/00* (2006.01)

(52) U.S. Cl.
USPC ........... 250/271; 250/555; 235/435; 235/440; 235/462.01; 235/462.24; 235/468

(58) Field of Classification Search
CPC ......... F21V 5/002; F21V 5/007; F21V 13/02; G06K 7/10732; G06K 7/10742; G06K 7/10821; G06K 7/10831
USPC .............. 250/566, 568, 338.1, 271; 235/435, 235/440, 462.01, 462.21, 462.24, 468
See application file for complete search history.

(56) References Cited

U.S. PATENT DOCUMENTS

| 4,782,219 | A | * | 11/1988 | Crater | 235/462.21 |
|---|---|---|---|---|---|
| 5,406,060 | A | * | 4/1995 | Gitin | 235/462.42 |
| 5,585,616 | A | * | 12/1996 | Roxby et al. | 235/462.06 |
| 5,586,212 | A | * | 12/1996 | McConica et al. | 385/146 |
| 6,039,255 | A | * | 3/2000 | Seo | 235/462.35 |
| 6,557,765 | B1 | | 5/2003 | Kito | |
| 6,712,270 | B2 | | 3/2004 | Leach | |
| 6,854,650 | B2 | * | 2/2005 | Hattersley et al. | 235/454 |
| 6,917,723 | B1 | | 7/2005 | Tamburrini | |
| 7,007,844 | B2 | | 3/2006 | Barkan et al. | |

(Continued)

FOREIGN PATENT DOCUMENTS

| EP | 1690162 B1 | 1/2012 |
|---|---|---|
| WO | 2006060785 A2 | 6/2006 |
| WO | 2010036277 A1 | 4/2010 |
| WO | 2012099977 A2 | 7/2012 |

OTHER PUBLICATIONS

International Search Report and Written Opinion for counterpart International Patent Application No. PCT/US2013/063021 mailed Dec. 11, 2013.

*Primary Examiner* — David Porta
*Assistant Examiner* — Yara B Green
(74) *Attorney, Agent, or Firm* — Nong-Qiang Fan (57) ABSTRACT

An apparatus includes a light emitting diode operative to emit mostly invisible light within an invisible bandwidth, and a scattering surface configured to scatter a first portion of the invisible light from the light emitting diode out of the window. The scattering surface is also partially transparent to allow a second portion of the invisible light from the light emitting diode to pass through the scattering surface and strike the reflector that is configured to reflect at least some of the second portion of the invisible light towards the window. The apparatus further includes a photodetector configured to detect returned invisible light from the target object.

20 Claims, 7 Drawing Sheets

(56) References Cited

U.S. PATENT DOCUMENTS

| | | |
|---|---|---|
| 7,017,812 B1 | 3/2006 | Schramm, Jr. et al. |
| 7,398,927 B2 | 7/2008 | Olmstead et al. |
| 7,516,899 B2 * | 4/2009 | Laser .......................... 235/468 |
| 7,614,563 B1 | 11/2009 | Nunnink et al. |
| 7,617,984 B2 | 11/2009 | Nunnink |
| 7,762,464 B2 | 7/2010 | Goren et al. |
| 7,796,489 B2 * | 9/2010 | Wu et al. .................. 369/112.01 |
| 8,102,580 B2 | 1/2012 | Duncan |
| 8,181,885 B2 | 5/2012 | Lapstun |
| 8,196,834 B2 | 6/2012 | Vinogradov et al. |

* cited by examiner

OBJECT DETECTING SYSTEM FOR IMAGING-BASED BARCODE READERS

FIELD OF THE DISCLOSURE

The present disclosure relates generally to imaging-based barcode readers.

BACKGROUND

Various electro-optical systems have been developed for reading optical indicia, such as barcodes. A barcode is a coded pattern of graphical indicia comprised of a series of bars and spaces of varying widths. In a barcode, the bars and spaces having differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 1A:
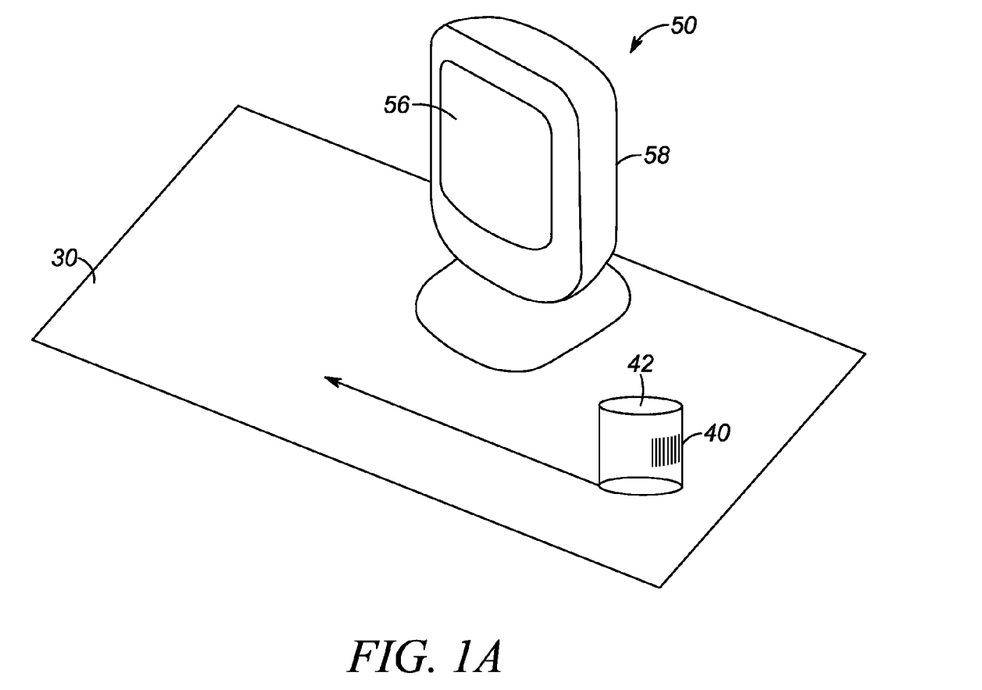
FIG. 1A and FIG. 1B depict an imaging scanner in accordance with some embodiments.
Figure 1B:
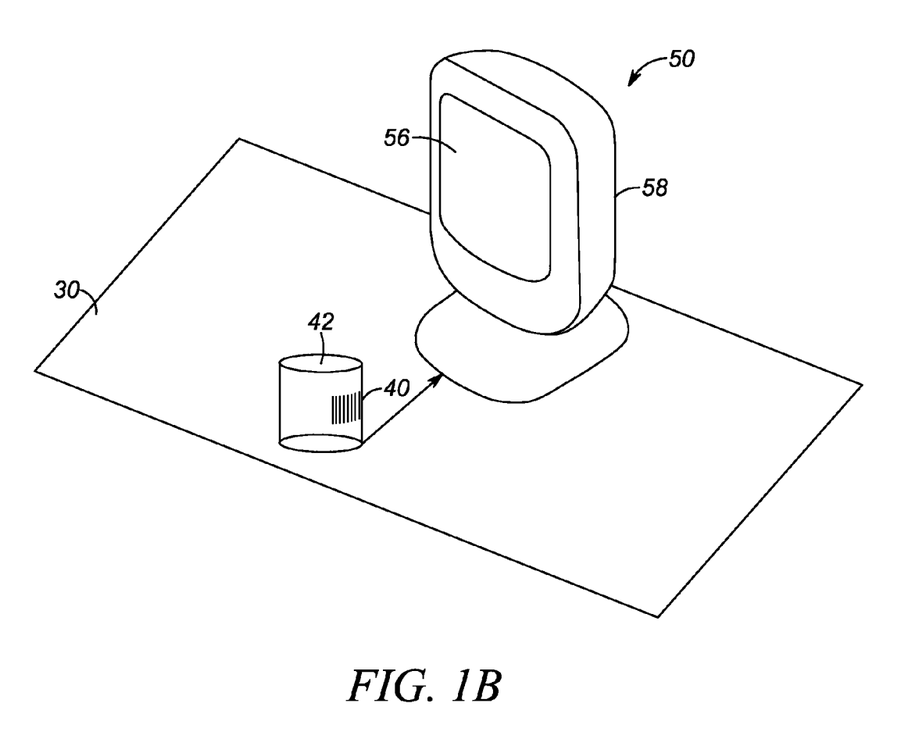

FIG. 1A and FIG. 1B depict an imaging scanner 50 in accordance with some embodiments. The imaging scanner 50 has a window 56 and a housing 58. The imaging scanner 50 is typically a portable reader that has a base for supporting itself on a flat surface 30, such as, a countertop. The window 56 generally faces an operator at the workstation. As shown in FIG. 1A, the operator can slide or swipe the product 40 past the window 56 from right to left, or from left to right, in a "swipe" mode, to let an image of the barcode 40 on the product 42 be captured by the imaging scanner 50. Alternatively, the operator can present the barcode 40 on the product 42 to the center of the window 56 in a "presentation" mode. The choice depends on operator preference or on the layout of the workstation.

Figure 2:
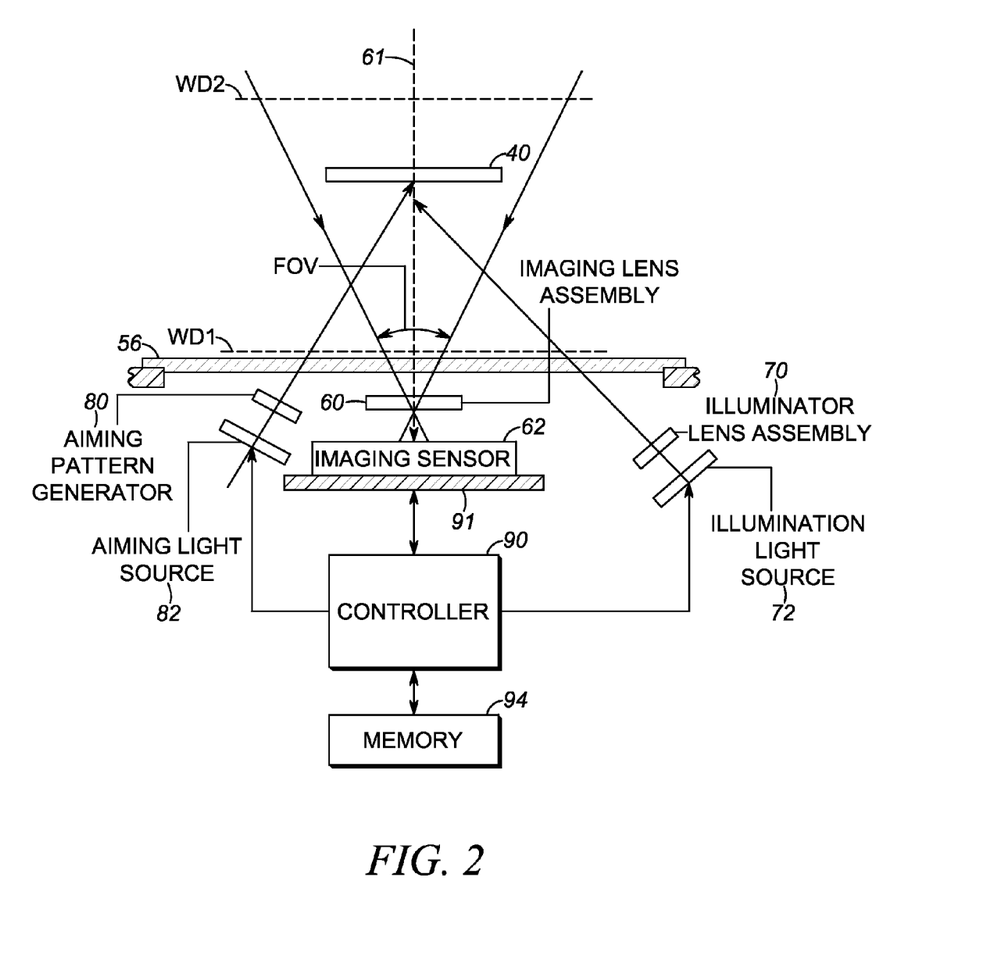
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination light source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as imaging data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination light source 72 are designed to operate together for generating an illuminating light towards the barcode 40 during an illumination time period. The illumination light source 72 can include one or more light emitting diodes (LED). The illumination light source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination light source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination light source 72 for a predetermined illumination time period. The controller 90 then exposes the imaging sensor 62 to capture an image of the barcode 40. The captured image of the barcode 40 is transferred to the controller 90 as imaging data. Such imaging data is digitally processed by the decoder in the controller 90 to decode the barcode. The information obtained from decoding the barcode 40 is then stored in the memory 94 or sent to other devices for further processing.

The illumination light source 72 usually is energized to address low ambient light conditions and to minimize hand jitter impact or swiping objects though the FOV on reading performance. On the other hand having bright illumination of an imaging scanner in constantly on state is annoying and bothersome for the user. It is also not efficient from power management perspective. Therefore it is beneficial to have an object sensing system which energizes illumination system when the object of interest is presented within the predetermined FOV of the imaging scanner 50 and at a certain distance from the scanner.

Figure 3A:
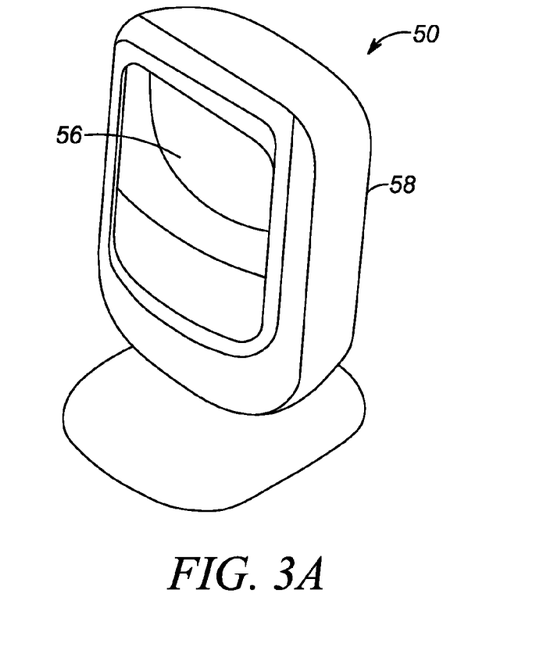
FIGS. 3A-3B depict an imaging scanner that includes an object detecting system behind the window of the imaging scanner.
Figure 3B:
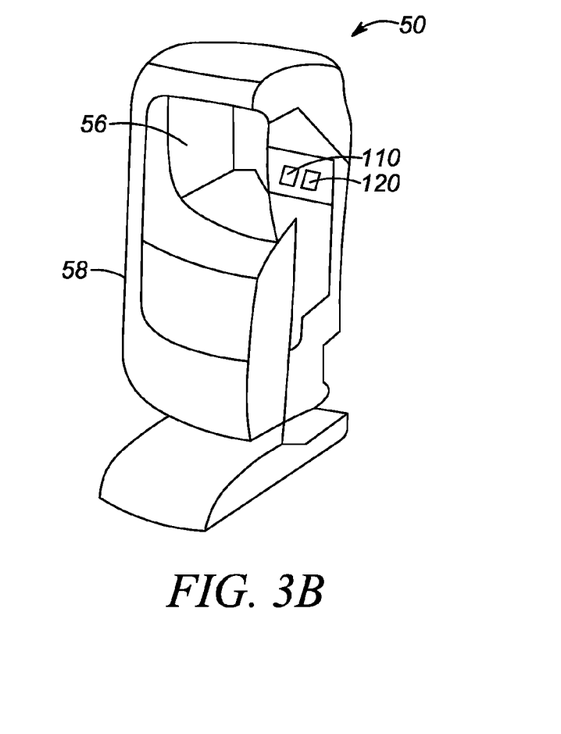

FIGS. 3A-3B depict an imaging scanner 50 that includes an object detecting system behind the window 56. The object detecting system in FIG. 3B includes an infrared LED 110 and a photodetector 120. In some existing implementations, the infrared light projecting out of the window 56 mainly originates from one particular area—LED chip which may or may not have an auxiliary lens. These implementations place some limitation on the effectiveness of the object detecting system. This limitation becomes apparent in case of reading barcodes from cell phones, a user application that has recently become very popular. Typically, cell phone screen is designed in such a way which minimizes reflected light from its surface. Therefore reflected/scattered light of the object sensor LED is very low, which is nearly impossible for detection at larger distances. In general cell phones have very strong specular reflection from the screen. Therefore in a particular orientation of the cell phone, the returned specular reflection signal is quite strong and the object sensor can be activated at a longer distance. Unfortunately, this occurs if the cell phone is presented at a particular orientation only within a limited range of angle.

Figure 4A:
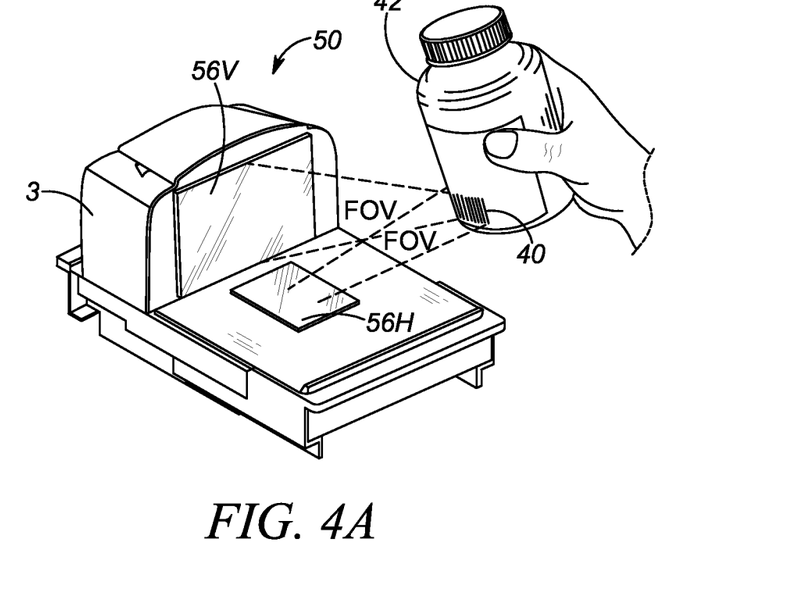
FIG. 4A depicts a bi-optic imager that includes a horizontal window and a vertical window in accordance with some embodiments.
Figure 4B:
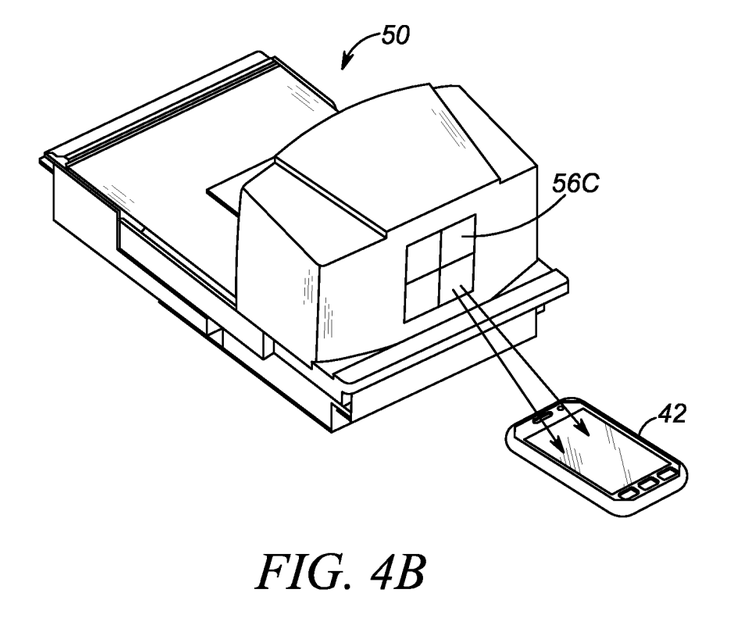
FIG. 4B depicts a bi-optic imager that also includes a customer-side window in accordance with some embodiments.

In general, as shown in FIGS. 4A-4B, an imaging scanner 50 can be an bi-optic imager that includes a horizontal window 56H and a vertical window 56V, and the bi-optic imager can include one object detecting system behind the horizontal window 56H and another object detecting systems behind the vertical window 56V. When the barcode 40 on the product 42 is present or swiped across the windows 56H or 56V, the process of capturing one or more images of the barcode 40 can be triggered by the object detecting system behind the windows 56H or 56V. In some implementations, as shown in FIG. 4B, the bi-optic imager 50 can also include a customer-side window 56C, an object detecting system behind the customer-side window 56C can be used to detect the presence of an object 42 in front of the customer-side window 56C. In some situations, when the product 42 in FIG. 4A has a glassy surface or when the object 42 in FIG. 4B is a cell phone, the specular reflections from the glassy surface or from the flat screen of the cell phone can adversely affect the performance of the object detecting systems in the bi-optic imager. It is generally desirable to provide an improved object detecting system.

Figure 5:
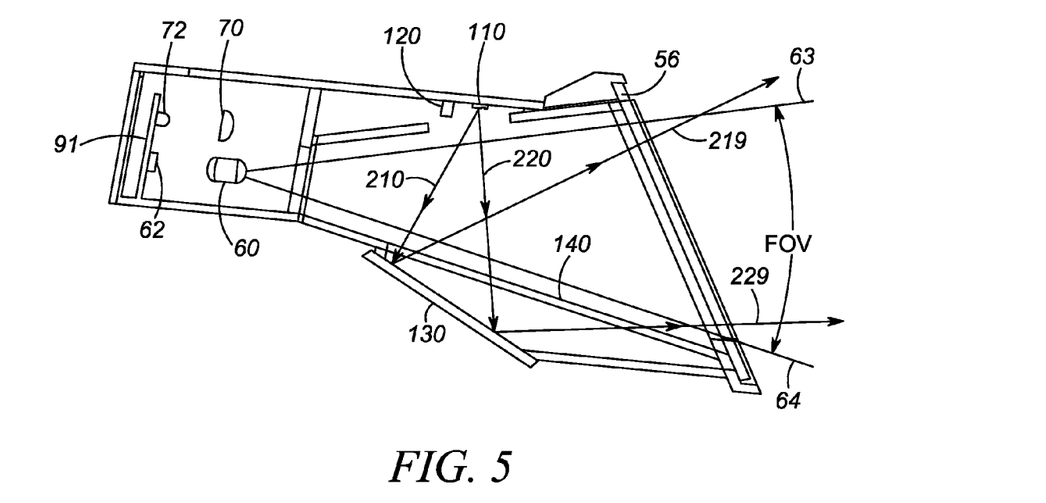
FIGS. 5-7 depict an improved object detecting system in accordance with some embodiments.
Figure 6:
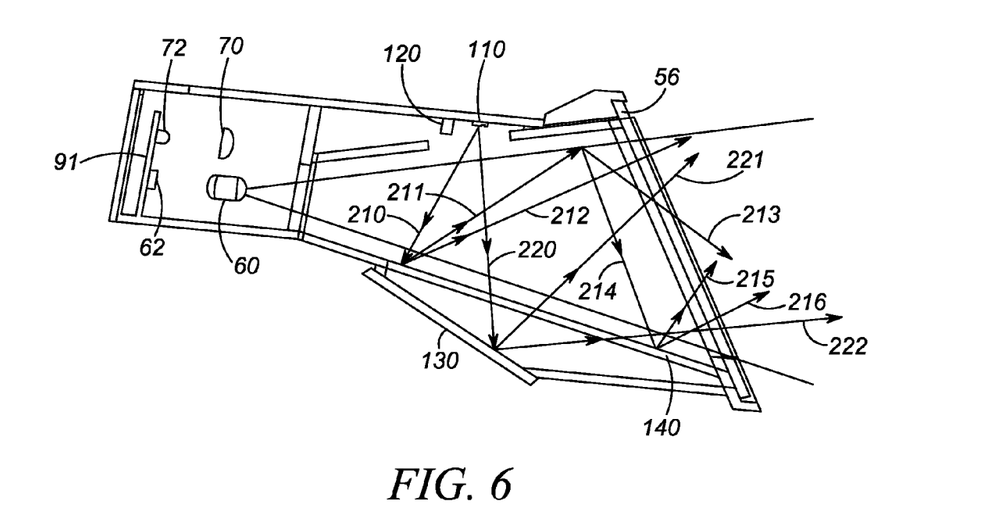
Figure 7:
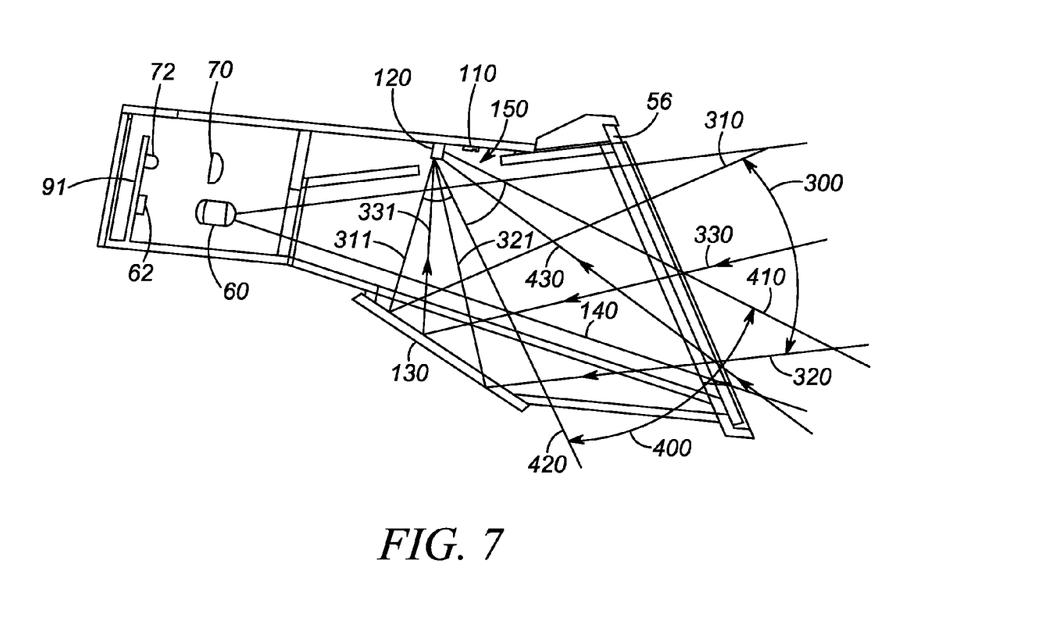

FIGS. 5-7 depict an improved object detecting system in accordance with some embodiments. The object detecting system in FIGS. 5-7 includes an infrared LED 110, a photodetector 120, a reflector 130, and a scattering surface 140 that is also partially transparent. The object detecting system in FIGS. 5-7 is used for detecting the presence of an object in front of a window 56. Such object detecting system can also be used for detecting the presence of an object in front of the horizontal window 56H, the vertical window 56V, or the customer-side window 56C of a bi-optic imager as shown in FIGS. 4A-4B. Also shown in FIGS. 5-7 are some of the key components of the imaging scanner 50, such as, the imaging sensor 62, the imaging lens arrangement 60, the illuminating lens arrangement 70, and the illumination light source 72. In addition, the field of view (FOV) of the imaging scanner 50 is also shown in FIGS. 5-7.

The object detecting system in FIGS. 5-7 is configured to make such wakeup sensor system less sensitive to specular surface orientation in the far field. In FIGS. 5-7, the outgoing light for the wakeup sensor system are split into both directional and scattered light paths. This will increase the number of possible light path angles leaving the system which in turn will increase the probability that one of these light paths will reflect from the specular surface and reenter the wakeup system's field of view.

As shown in FIG. 5, the IR emitter has one component of its intensity that hits a mirror, providing highly directional outgoing path. This aids the system in illuminating far field objects. In FIG. 5, because the scattering surface 140 is partially transparent, a portion of the invisible light from the infrared LED 110 passes through the scattering surface 140 and strikes the reflector 130 that is configured to reflect at least some of such invisible light towards the window 56. For example, some portion of the invisible light 210 from the infrared LED 110 passes through the scattering surface 140, strikes the reflector 130, and is reflected towards the window 56 as light 219; in addition, some portion of the invisible light 220 from the infrared LED 110 passes through the scattering surface 140, strikes the reflector 130, and is reflected towards the window 56 as light 229. Similarly, some portion of light rays from the infrared LED 110 propagating in a direction between the ray of light 210 and the ray of light 220 will be reflected out of the window 56 as light rays propagating in a direction between the ray of light 219 and the ray of light 229.

As shown in FIG. 6, the IR emitter has another component of its intensity that hits a scattering surface, which provides outgoing light in many different directions. This aids the system in illuminating nearby specular surfaces at many different angles. In FIG. 6, some portion of the invisible light from the infrared LED 110, after scattered by the scattering surface 140, propagates out of the window 56 directly or out of the window 56 indirectly after further scattered by other surfaces. For example, some portion of the invisible light 210 from the infrared LED 110, after scattered by the scattering surface 140, propagates out of the window 56 directly as light 212. But some portion of the invisible light 210 from the infrared LED 110 is scattered by the scattering surface 140 as light 211; subsequently, some of the light 211, after further scattering by one or more surfaces, propagates out of the window 56 indirectly as light 213, light 215, or 216. Similarly, some portion of the invisible light 220 from the infrared LED 110, after scattered by the scattering surface 140, propagates out of the window 56 directly as light 221 and light 222.

Additionally, in FIGS. 5-7, the wakeup system's field of view can be broken down into more than one component, each pointing in a generally different direction. This can increase the chance that it will see a highly directional returning light ray that has reflected from a specular surface. For example, as shown in FIG. 7, the field of view of the object detecting system includes at least two components—a first sub-field of view 300 and a second sub-field of view 400— each pointing in a generally different direction. In FIG. 7, the first sub-field of view 300 falls upon the reflector 130 which angles the field of view to receive incoming rays that are generally parallel to the imaging path and downward angled incoming rays; furthermore, the front aperture 150 for the IR detector 120 is left open so that the photodetector 120 can see upward angled incoming rays in the second sub-field of view 400. Specifically, light ray 330 within the first sub-field of view 300 is reflected by the reflector 130 as light ray 331 that is detected by the photodetector 120 after passing through the front aperture 150. Light ray 430 within the second sub-field of view 400, after passing through the front aperture 150, is also detected by the photodetector 120. The wakeup system can include additional apertures positioned in front of the infrared LED 110 or the photodetector 120 for defining the first sub-field of view 300 and the second sub-field of view 400.

The object detecting system as shown in FIGS. 5-7 can retain good performance on far field objects of a non-specular nature, and also have good performance on near field objects of a specular nature. This is ideal for a scanner that wants to detect reflective objects that are presented to it in the near field, such as a customer facing scanner that wants to wake up when a highly specular phone surface is presented to it.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a housing having a window;
   an illumination source within the housing for providing illumination light directed toward a target object;
   an imaging sensor having an array of photosensitive elements for capturing an image from the target object;
   a light emitting diode within the housing operative to emit mostly invisible light within an invisible bandwidth;
   a reflector within the housing;
   a scattering surface located within the housing and configured to scatter a first portion of the invisible light from the light emitting diode out of the window, wherein the scattering surface is also partially transparent to allow a second portion of the invisible light from the light emitting diode to pass through the scattering surface and strike the reflector that is configured to reflect at least some of the second portion of the invisible light towards the window;
   a photodetector configured to detect returned invisible light from the target object to generate an electrical signal; and
   a controller configured to activate the illumination source for providing the illumination light directed toward the target object for image capturing when the electrical signal generated by the photodetector indicates that the returned invisible light from the target object is detected.

2. The apparatus of claim 1, wherein the scattering surface is configured to scatter some of the first portion of the invisible light directly towards the window.

3. The apparatus of claim 1, wherein the scattering surface is configured to scatter some of the first portion of the invisible light towards another surface before subsequently exiting the window.

4. The apparatus of claim 1, further comprising:
   a front aperture positioned in front of the photodetector and configured to allow a ray of the returned invisible light entering the window be detected by the photodetector after the ray of the returned invisible light entering the window is incident upon the reflector and reflected by the reflector.

5. The apparatus of claim 4, wherein the front aperture is further configured to allow the invisible light from the light emitting diode be incident upon the scattering surface.

6. The apparatus of claim 1, further comprising:
   a front aperture positioned in front of the photodetector and configured to allow a ray of the returned invisible light entering the window be directly directed by the photodetector.

7. The apparatus of claim 6, wherein the front aperture is further configured to allow the invisible light from the light emitting diode be incident upon the scattering surface.

8. The apparatus of claim 1, further comprising:
   a front aperture positioned in front of the photodetector and configured to allow a ray of the returned invisible light entering the window be detected by the photodetector after the ray of the returned invisible light entering the window is incident upon the reflector and reflected by the reflector, and the front aperture being further configured to allow another ray of the returned invisible light entering the window be directly detected by the photodetector.

9. A method of operating a barcode reader to decode a barcode on a target object, the barcode reader includes a housing having a window and an object detection system having a light emitting diode operative to emit mostly invisible light within an invisible bandwidth, the method comprising:
   activating the light emitting diode to emit the invisible light towards a scattering surface located within the housing;
   scattering with the scattering surface a first portion of the invisible light from the light emitting diode out of the window;
   transmitting a second portion of the invisible light from the light emitting diode through the scattering surface to cause the second portion of the invisible light to strike a reflector and to cause at least some of the second portion of the invisible light be reflected towards the window by the reflector;
   detecting returned invisible light from the target object with a photodetector to generate an electrical signal;
   activating an illumination source for providing illumination directed toward the target object for image capturing when the electrical signal generated by the photodetector indicates that the returned invisible light from the target object is detected; and
   capturing an image from the target object with an imaging sensor having an array of photosensitive elements.

10. The method of claim 9, wherein said scattering with the scattering surface comprises:
    scattering some of the first portion of the invisible light directly towards the window.

11. The method of claim 9, wherein said scattering with the scattering surface comprises:
    scattering some of the first portion of the invisible light towards another surface before subsequently exiting the window.

12. The method of claim 9, further comprising:
    detecting a ray of the returned invisible light entering the window with the photodetector after the ray of the returned invisible light entering the window is reflected by the reflector and passes through a front aperture positioned in front of the photodetector.

13. The method of claim 12, further comprising:
    causing the invisible light from the light emitting diode be incident upon the scattering surface after the invisible light from the light emitting diode passes through the front aperture.

14. The method of claim 9, further comprising:
    detecting a ray of the returned invisible light entering the window with the photodetector directly after the ray of the returned invisible light entering passes through a front aperture positioned in front of the photodetector.

15. The method of claim 14, further comprising:
    causing the invisible light from the light emitting diode be incident upon the scattering surface after the invisible light from the light emitting diode passes through the front aperture.

16. The method of claim 9, further comprising:
    detecting a first ray of the returned invisible light entering the window with the photodetector after the first ray of the returned invisible light entering the window is reflected by the reflector and passes through a front aperture positioned in front of the photodetector; and
    detecting a second ray of the returned invisible light entering the window with the photodetector directly after the second ray of the returned invisible light entering passes through the front aperture.

17. An apparatus comprising:
    a housing having a window;
    an illumination source within the housing for providing illumination light directed toward a target object;

an imaging sensor having an array of photosensitive elements for capturing an image from the target object;

a light emitting diode within the housing operative to emit mostly invisible light within an invisible bandwidth;

means for scattering some of the invisible light from the light emitting diode out of the window;

means for reflecting some of the invisible light from the light emitting diode towards the window;

a photodetector configured to detect returned invisible light from the target object to generate an electrical signal; and a controller configured to activate the illumination source for providing the illumination light directed toward the target object for image capturing when the electrical signal generated by the photodetector indicates that the returned invisible light from the target object is detected.

18. The apparatus of claim 17, wherein said means for reflecting comprises:

means for reflecting some of the invisible light from the light emitting diode towards the window and for reflecting a ray of the returned invisible light entering the window into the photodetector after the ray of the returned invisible light entering the window passes through a front aperture positioned in front of the photodetector.

19. The apparatus of claim 17, wherein said means for reflecting comprises:

means for reflecting some of the invisible light from the light emitting diode towards the window and for reflecting a ray of the returned invisible light entering the window into the photodetector after the ray of the returned invisible light entering the window passes through an aperture means.

20. The apparatus of claim 17, wherein said means for reflecting comprises:

means for detecting a ray of the returned invisible light entering the window directly after the ray of the returned invisible light entering passes through an aperture means.

* * * * *